United States Patent
Wu

(10) Patent No.: US 11,709,498 B2
(45) Date of Patent: Jul. 25, 2023

(54) METHOD, SYSTEM AND RELATED DEVICE OF IMPLEMENTING VEHICLE AUTOMATIC LOADING AND UNLOADING

(71) Applicant: BEIJING TUSEN ZHITU TECHNOLOGY CO., LTD., Beijing (CN)

(72) Inventor: Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 181 days.

(21) Appl. No.: 16/035,665

(22) Filed: Jul. 15, 2018

(65) Prior Publication Data

US 2019/0025846 A1 Jan. 24, 2019

(30) Foreign Application Priority Data

Jul. 21, 2017 (CN) .......................... 201710600741.7

(51) Int. Cl.
*G05D 1/02* (2020.01)
*G08G 1/017* (2006.01)
(Continued)

(52) U.S. Cl.
CPC ........... *G05D 1/0225* (2013.01); *B65G 67/02* (2013.01); *B65G 69/2882* (2013.01);
(Continued)

(58) Field of Classification Search
CPC ....... G05D 1/0225; H04W 4/40; B65G 67/02; B65G 69/2882; G07C 5/008; G08G 1/017;
(Continued)

(56) References Cited

U.S. PATENT DOCUMENTS 5,369,591 A * 11/1994 Broxmeyer ............... G08G 1/22
340/436
5,815,825 A * 9/1998 Tachibana ................ G08G 1/22
318/587
(Continued)

FOREIGN PATENT DOCUMENTS

CN 101269751 A 9/2008
CN 101754914 A 6/2010
(Continued)

OTHER PUBLICATIONS

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
(Continued)

*Primary Examiner* — Daniel L Greene
(74) *Attorney, Agent, or Firm* — Paul Liu; Julie J. Muyco; Perkins Coie LLP

(57) ABSTRACT

The invention discloses a method, system and related device of implementing vehicle automatic loading and unloading, so as to achieve the automatic loading and unloading of the unmanned vehicle. The method includes: controlling, by a vehicle controller, a vehicle to drive automatically and stop at a loading and unloading position; obtaining, by a loading and unloading control apparatus corresponding to the loading and unloading position, vehicle identification information of the vehicle; verifying the vehicle identification information and controlling a loading and unloading machine to load and unload when the verification succeeds; sending a loading and unloading completion indication to the vehicle controller after the loading and unloading is completed; and controlling, by the vehicle controller, the
(Continued)

vehicle to leave the loading and unloading position when receiving the loading and unloading completion indication.

20 Claims, 5 Drawing Sheets

(51) Int. Cl.

| | | |
|---|---|---|
| *G07C 5/00* | (2006.01) | |
| *H04W 4/40* | (2018.01) | |
| *G08G 1/0968* | (2006.01) | |
| *B65G 67/02* | (2006.01) | |
| *B65G 69/28* | (2006.01) | |
| *G08G 1/127* | (2006.01) | |
| *G08G 1/0967* | (2006.01) | |
| *G08G 1/00* | (2006.01) | |
| *H04W 4/44* | (2018.01) | |

(52) U.S. Cl.
CPC ............. *G07C 5/008* (2013.01); *G08G 1/017* (2013.01); *G08G 1/0968* (2013.01); *G08G 1/096783* (2013.01); *G08G 1/127* (2013.01); *G08G 1/202* (2013.01); *H04W 4/40* (2018.02); *G05D 2201/0213* (2013.01); *H04W 4/44* (2018.02)

(58) Field of Classification Search
CPC .. G08G 1/127; G08G 1/202; G08G 1/096783; G08G 1/0968
See application file for complete search history.

(56) References Cited

U.S. PATENT DOCUMENTS

| | | | | |
|---|---|---|---|---|
| 6,421,600 | B1* | 7/2002 | Ross | B60L 50/30 |
| | | | | 701/117 |
| 6,777,904 | B1 | 8/2004 | Degner | |
| 7,103,460 | B1 | 9/2006 | Breed | |
| 7,367,528 | B2* | 5/2008 | Allison, Sr. | B64D 11/00 |
| | | | | 244/118.6 |
| 7,648,329 | B2* | 1/2010 | Chilson | B60L 15/2036 |
| | | | | 180/168 |
| 7,783,403 | B2 | 8/2010 | Breed | |
| 8,412,449 | B2 | 4/2013 | Trepagnier | |
| 8,788,134 | B1 | 7/2014 | Litkouhi | |
| 8,965,621 | B1 | 2/2015 | Urmson | |
| 9,002,632 | B1 | 4/2015 | Emigh | |
| 9,111,444 | B2 | 8/2015 | Kaganovich | |
| 9,134,402 | B2 | 9/2015 | Sebastian | |
| 9,248,835 | B2 | 2/2016 | Tanzmeister | |
| 9,315,192 | B1 | 4/2016 | Zhu | |
| 9,317,033 | B2 | 4/2016 | Ibanez-guzman | |
| 9,342,074 | B2 | 5/2016 | Dolgov | |
| 9,399,397 | B2 | 7/2016 | Mizutani | |
| 9,438,878 | B2 | 9/2016 | Niebla | |
| 9,476,970 | B1 | 10/2016 | Fairfield | |
| 9,535,423 | B1 | 1/2017 | Debreczeni | |
| 9,568,915 | B1 | 2/2017 | Berntorp | |
| 9,587,952 | B1 | 3/2017 | Slusar | |
| 9,713,977 | B1* | 7/2017 | Neal | B60P 1/4442 |
| 9,720,418 | B2 | 8/2017 | Stenneth | |
| 9,723,097 | B2 | 8/2017 | Harris | |
| 9,723,099 | B2 | 8/2017 | Chen | |
| 9,738,280 | B2 | 8/2017 | Rayes | |
| 9,746,550 | B2 | 8/2017 | Nath | |
| 10,650,684 | B2* | 5/2020 | Ricci | G08G 5/0013 |
| 2004/0199785 | A1* | 10/2004 | Pederson | H04N 7/18 |
| | | | | 340/293 |
| 2005/0192702 | A1* | 9/2005 | Moutsokapas | B65G 63/004 |
| | | | | 700/213 |
| 2007/0265856 | A1* | 11/2007 | Robinson | G06Q 30/0601 |
| | | | | 705/26.1 |
| 2007/0278464 | A1* | 12/2007 | Constant | B60P 1/5471 |
| | | | | 254/1 |
| 2008/0103660 | A1* | 5/2008 | Browne | B60R 25/1004 |
| | | | | 701/46 |
| 2008/0249667 | A1 | 10/2008 | Horvitz | |
| 2008/0252417 | A1* | 10/2008 | Thomas | G06Q 10/08 |
| | | | | 340/10.1 |
| 2009/0040054 | A1 | 2/2009 | Wang | |
| 2010/0049397 | A1 | 2/2010 | Lin | |
| 2010/0265068 | A1* | 10/2010 | Brackmann | B60P 3/14 |
| | | | | 340/572.1 |
| 2011/0243697 | A1* | 10/2011 | Braun | B60P 1/006 |
| | | | | 414/506 |
| 2013/0236279 | A1* | 9/2013 | Franzen | B65G 67/02 |
| | | | | 414/399 |
| 2014/0207344 | A1* | 7/2014 | Ihlenburg | E05F 15/73 |
| | | | | 701/49 |
| 2014/0270383 | A1* | 9/2014 | Pederson | G08G 1/04 |
| | | | | 382/104 |
| 2015/0356481 | A1* | 12/2015 | Mains | G06Q 50/28 |
| | | | | 705/7.13 |
| 2015/0379468 | A1* | 12/2015 | Harvey | G06Q 10/08355 |
| | | | | 705/338 |
| 2016/0019497 | A1* | 1/2016 | Carvajal | H04W 4/029 |
| | | | | 701/519 |
| 2016/0321381 | A1 | 11/2016 | English | |
| 2016/0341565 | A1* | 11/2016 | Meuleau | G05D 1/0217 |
| 2016/0375907 | A1 | 12/2016 | Erban | |
| 2017/0129379 | A1* | 5/2017 | Boscher | B60P 1/649 |
| 2017/0158430 | A1* | 6/2017 | Raizer | B65G 1/137 |
| 2017/0278061 | A1* | 9/2017 | Skaaksrud | H04W 4/029 |
| 2018/0089616 | A1* | 3/2018 | Jacobus | G06K 19/06037 |
| 2018/0099712 | A1* | 4/2018 | Bean | B62D 63/08 |
| 2018/0194575 | A1* | 7/2018 | Anderson | B65G 67/02 |
| 2018/0259976 | A1* | 9/2018 | Williams | G05D 1/0088 |
| 2018/0300675 | A1* | 10/2018 | Arena | G07C 9/00182 |
| 2018/0373236 | A1* | 12/2018 | Ewert | G06K 7/10366 |
| 2020/0159221 | A1* | 5/2020 | Wu | G06Q 10/08 |

FOREIGN PATENT DOCUMENTS

| | | |
|---|---|---|
| CN | 102890510 A | 1/2013 |
| CN | 105205629 A | 12/2015 |
| CN | 205675779 A | 11/2016 |
| CN | 106681321 A | 5/2017 |

OTHER PUBLICATIONS

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

No Author. First Search Report, Chinese Application 2017106007417, dated Mar. 5, 2019, pp. 1-2.

No Author. First Office Action, Chinese Application No. 201706007417, dated Mar. 12, 2019, pp. 1-15.

No Author. Second Office Action, Chinese Application No. 2017006007417, dated Jul. 11, 2019, pp. 1-17.

No Author. Third Office Action, Chinese Application No. 2017006007417, dated May 15, 2020, pp. 1-17.

* cited by examiner

METHOD, SYSTEM AND RELATED DEVICE OF IMPLEMENTING VEHICLE AUTOMATIC LOADING AND UNLOADING

CROSS-REFERENCES TO RELATED APPLICATIONS

The present application claims the priority from Chinese Patent Application No. 201710600741.7, filed with the Chinese Patent Office on Jul. 21, 2017 and entitled "METHOD, SYSTEM AND RELATED DEVICE OF IMPLEMENTING VEHICLE AUTOMATIC LOADING AND UNLOADING", which is hereby incorporated by reference in its entirety.

FIELD OF INVENTION

The invention relates to the autonomous driving field, and particularly to a method of implementing vehicle automatic loading and unloading, a system of implementing vehicle automatic loading and unloading, a vehicle controller, and a loading and unloading control apparatus.

BACKGROUND

With the development of the autonomous driving technology, the autonomous vehicles will be more and more popular. Thus, for the autonomous vehicles, how to implement the automatic cargo transportation between the particular arears (such as highway ports, sea-front ports, warehouses, logistics companies, goods collecting and distributing centers and the like) becomes an urgent problem to be solved by those skilled in the art. However, one indispensable link in implementing the automatic cargo transportation is automatic loading and unloading, but there is no related technology of implementing the automatic loading and unloading at present.

BRIEF SUMMARY

In view of the above problem, the invention provides a method and system of implementing vehicle automatic loading and unloading, a vehicle controller, and a loading and unloading control apparatus.

An embodiment of the invention provides a method of implementing vehicle automatic loading and unloading, which includes:
controlling, by a vehicle controller, a vehicle to drive automatically and stop at a loading and unloading position;
obtaining, by a loading and unloading control apparatus corresponding to the loading and unloading position, vehicle identification information of the vehicle; verifying the vehicle identification information and controlling a loading and unloading machine to load and unload when the verification succeeds; sending a loading and unloading completion indication to the vehicle controller after the loading and unloading is completed; and
controlling, by the vehicle controller, the vehicle to leave the loading and unloading position when receiving the loading and unloading completion indication.

An embodiment of the invention further provides a vehicle controller, which includes:
a communication unit configured to receive and send information; and
a control unit configured to control a vehicle to drive automatically and stop at a loading and unloading position; and control the vehicle to leave the loading and unloading position when receiving a loading and unloading completion indication sent by a loading and unloading control apparatus corresponding to the loading and unloading position.

An embodiment of the invention further provides a loading and unloading control apparatus, which includes:
a communication unit configured to receive and send information; and
a loading and unloading control unit configured to obtain vehicle identification information of a vehicle stopping at a loading and unloading position, and verify the vehicle identification information; control a loading and unloading machine to load and unload when the verification succeeds, and send, by the communication unit, a loading and unloading completion indication to a vehicle controller of the vehicle after the loading and unloading is completed.

An embodiment of the invention provides a system of implementing vehicle automatic loading and unloading, which includes:
a vehicle controller configured to control a vehicle to drive automatically and stop at a loading and unloading position; and control the vehicle to leave the loading and unloading position when receiving a loading and unloading completion indication sent by a loading and unloading control apparatus corresponding to the loading and unloading position; and
the loading and unloading control apparatus configured to obtain vehicle identification information of the vehicle, and verify the vehicle identification information; control a loading and unloading machine to load and unload when the verification succeeds, and send the loading and unloading completion indication to the vehicle controller of the vehicle after the loading and unloading is completed.

BRIEF DESCRIPTION OF THE DRAWINGS

The accompanying drawings are used to provide the further understanding of the invention and constitute a part of the specification, and serve to explain the invention together with the embodiments of the invention but not limit the invention.

DETAILED DESCRIPTION OF THE EMBODIMENTS

In order to make those skilled in the art better understand the technical solution in the invention, the technical solution in the embodiments of the invention will be described clearly and completely below in combination with the accompanying drawings in the embodiments of the invention. Obviously the described embodiments are just a part of the embodiments of the invention but not all the embodiments. Based upon the embodiments of the invention, all of other embodiments obtained by those ordinary skilled in the art without creative work should pertain to the protection scope of the invention.

In the method and system of implementing vehicle automatic loading and unloading provided by the embodiments of the application, a loading and unloading control apparatus is arranged at each loading and unloading position, the vehicle controller controls the vehicle to drive automatically and stop at the loading and unloading position, and then the loading and unloading control apparatus corresponding to the loading and unloading position controls the loading and unloading machine to perform the automatic loading and unloading for the vehicle without manual intervention, thereby achieving the function of the automatic loading and unloading of the autonomous vehicle, so as to achieve the automatic loading and unloading of the autonomous vehicle.

In an embodiment of the invention, the vehicle controller of the vehicle can be a DSP (Digital Signal Processor), FPGA (Field-Programmable Gate Array) controller, industrial computer, driving computer, ECU (Electronic Control Unit), or VCU (Vehicle Control Unit) or the like, which is not limited strictly by the present application.

FIRST EMBODIMENT

Figure 1:
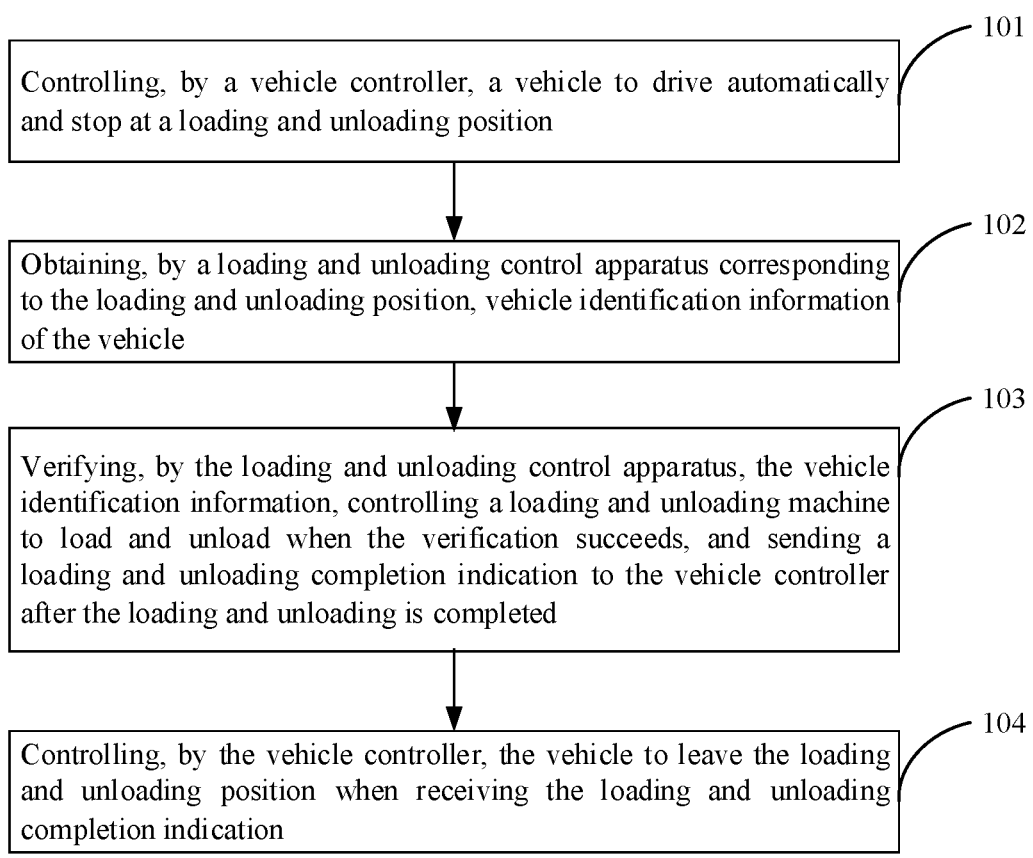
FIG. 1 is the first one of flow charts of a method of implementing vehicle automatic loading and unloading in an embodiment of the invention.

Referring to FIG. 1 which is a flow chart of a method of implementing vehicle automatic loading and unloading in an embodiment of the invention, the method includes:

Step 101: controlling, by a vehicle controller, a vehicle to drive automatically and stop at a loading and unloading position.

Step 102: obtaining, by a loading and unloading control apparatus corresponding to the loading and unloading position, vehicle identification information of the vehicle.

In an embodiment of the application, a corresponding loading and unloading control apparatus may be arranged respectively for each loading and unloading position, or a corresponding loading and unloading control apparatus may be arranged for a plurality of adjacent loading and unloading positions.

In an example, an earth inductor can be arranged at the loading and unloading position. When the earth inductor senses the vehicle stopping at the loading and unloading position, it sends a vehicle arriving indication carrying the number of the loading and unloading position to the loading and unloading control apparatus corresponding to the loading and unloading position, and the loading and unloading control apparatus obtains the vehicle identification information of the vehicle stopping at the loading and unloading position according to the vehicle arriving indication.

In another example, the vehicle controller sends a loading and unloading request to the loading and unloading control apparatus corresponding to the loading and unloading position when controlling the vehicle stops at the loading and unloading position, and then the loading and unloading control apparatus obtains the vehicle identification information of the vehicle according to the loading and unloading request.

In an embodiment of the invention, the loading and unloading control apparatus obtains the vehicle identification information of the vehicle, which can be implemented by but not limited to any of the following modes (modes A1 to A3):

Mode A1: the loading and unloading control apparatus receives the vehicle identification information from the vehicle controller. That is, the vehicle controller sends the vehicle identification information to the loading and unloading control apparatus actively.

Mode A2: the loading and unloading control apparatus controls a sensor to take an image of the vehicle, and performs image identification processing on the image to obtain the vehicle identification information of the vehicle.

The sensor can be a video camera which can be mounted nearly to the loading and unloading control apparatus or the loading and unloading position, e.g., can be mounted on a fixture (e.g., on the street lamp, at the road side, on the tree, on the warehouse door of the warehouse, on the gantry crane or the like) near the loading and unloading position. The angle of the lens of the video camera can be adjusted automatically.

According to the image posted back from the camera, the loading and unloading control apparatus can perform the image processing on this image. When the vehicle identification information is identified from the image, the vehicle identification information is to be verified; when the vehicle identification information is not identified from the image, the shooting angle of the camera is adjusted automatically and the above actions are repeated until the vehicle identification information is identified.

The loading and unloading control apparatus identifies the vehicle identification information from the image, which can be implemented by the following way: the loading and unloading control apparatus extracts features from the image, compares the extracted features with the features corresponding to the preset vehicle identification information, and determines the vehicle identification information according to the features compared successfully. In an embodiment of the invention, the above vehicle identification information is the information associated uniquely with the vehicle, for example, can be the license plate number. When the vehicle identification information is the license plate number, the features corresponding to the vehicle identification information include size, shape (rectangular frame), color (blue or black), text features (length of the text string in the rectangular frame) and the like.

Mode A3: the loading and unloading control apparatus controls the sensor to scan a two-dimensional code or bar code on the vehicle, to obtain the vehicle identification information of the vehicle.

In an embodiment of the invention, the two-dimensional code or bar code containing the vehicle identification information can be pasted or printed in advance on a particular position of the vehicle, such as the front windshield, the left side panel of the vehicle. The loading and unloading control apparatus adjusts the shooting angle of the camera until the two-dimensional code or bar code is scanned successfully.

Step 103: verifying, by the loading and unloading control apparatus, the vehicle identification information, controlling a loading and unloading machine to load and unload when the verification succeeds, and sending a loading and unloading completion indication to the vehicle controller after the loading and unloading is completed.

In an embodiment of the invention, the loading and unloading control apparatus verifies the vehicle identification information, which can be implemented by the following way: a vehicle identification information list is prestored in the loading and unloading control apparatus, and the loading and unloading control apparatus matches the vehicle identification information with the vehicle identification information list, if the match succeeds, then the verification succeeds, otherwise the verification fails; or, the loading and unloading control apparatus sends the vehicle identification information to a server remotely, and receives the verification result on whether the verification succeeds from the server.

Step 104: controlling, by the vehicle controller, the vehicle to leave the loading and unloading position when receiving the loading and unloading completion indication.

In a first example, the vehicle is a container vehicle, and the loading and unloading machine is a gantry crane, forklift or crane, then in the above step 103, the loading and unloading control apparatus controls the loading and unloading machine to load and unload, which can be achieved as follows: the loading and unloading control apparatus controls the loading and unloading machine to load a container corresponding to the vehicle identification information to the vehicle; or, controls the loading and unloading machine to unload a container from the vehicle. In the first example, a freight list is prestored in the loading and unloading control apparatus, and a correspondence between the vehicle identification information of each vehicle and the freight information is recorded in the freight list, wherein the freight information includes the container number, the position at which the container is located, and the loading and unloading position and the like. When the vehicle loads, the loading and unloading control apparatus obtains the container number, the container position and the loading and unloading position corresponding to the vehicle identification information from the freight list, and sends a loading instruction carrying the container number, the container position and the loading and unloading position to the loading and unloading machine, so that the loading and unloading machine reaches the container position and loads the container corresponding to the container number onto the vehicle stopping at the loading and unloading position. When the vehicle unloads, the loading and unloading control apparatus obtains the container number, the container position and the loading and unloading position corresponding to the vehicle identification information from the freight list, and sends an unloading instruction carrying the container number, the container position and the loading and unloading position to the loading and unloading machine, so that the loading and unloading machine unloads the container on the vehicle at the loading and unloading position and places the container at the container position.

Figure 2:
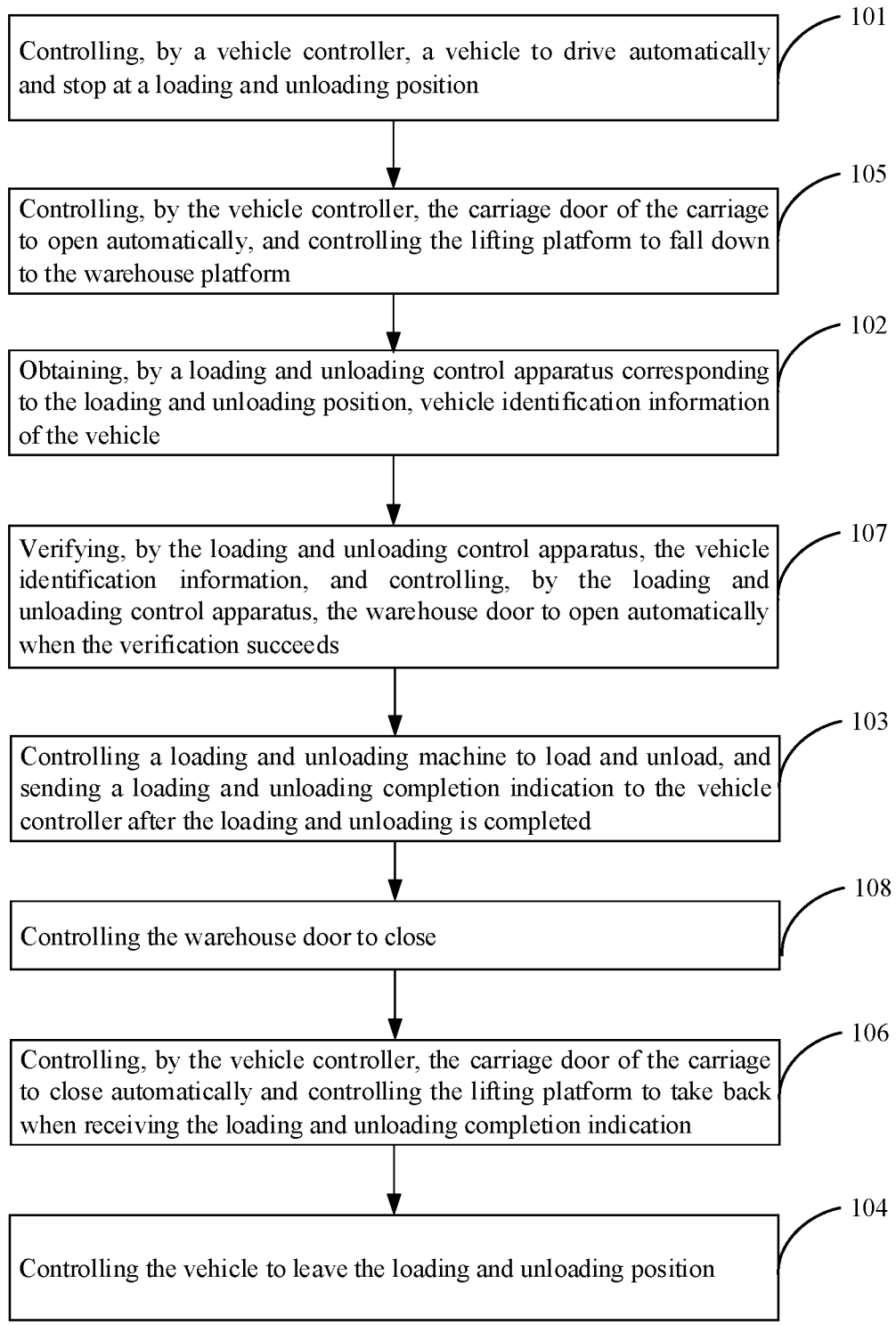
FIG. 2 is the second one of flow charts of a method of implementing vehicle automatic loading and unloading in an embodiment of the invention.

In a second example, the loading and unloading machine is a robot or forklift, the vehicle is a van, a carriage door of a carriage of the vehicle can be electronically controlled to open and close, a lifting platform is arranged at a lower end of the carriage door, the loading and unloading position is in front of a warehouse door of a target warehouse, the warehouse door has a warehouse platform; and the method as shown in FIG. 1 further includes steps 105, 106, 107 and 108, as shown in FIG. 2:

Step 105: controlling, by the vehicle controller, the carriage door of the carriage to open automatically, and controlling the lifting platform to fall down to the warehouse platform.

Step 106: controlling, by the vehicle controller, the carriage door of the carriage to close automatically and controlling the lifting platform to take back when receiving the loading and unloading completion indication.

Step 107: controlling, by the loading and unloading control apparatus, the warehouse door to open automatically.

Step 108: controlling, by the loading and unloading control apparatus, the warehouse door to close when the loading and unloading machine completes the loading and unloading.

In some embodiments, the magnetic nails or magnetic stripes are laid on the warehouse platform, the lifting platform and the carriage floor; and controlling, by the loading and unloading control apparatus, the loading and unloading machine to load and unload in the step 103 includes: controlling, by the loading and unloading control apparatus, the loading and unloading machine to uninterruptedly sense by its magnetic navigation sensor magnetic signals generated by the magnetic nails/magnetic stripes laid on the warehouse platform, the lifting platform and the carriage floor, and perform navigation tracking according to a preset and fixed path, to implement the loading and unloading.

In an embodiment of the invention, the carriage door of the carriage can have a variety of structures, and the carriage doors of the carriages with different structures correspond to different automatic open modes. The following first to fourth structures are only exemplary, and the structure of the carriage door of the carriage in the embodiments of the invention is not limited to the four types of structures below.

Figure 3:
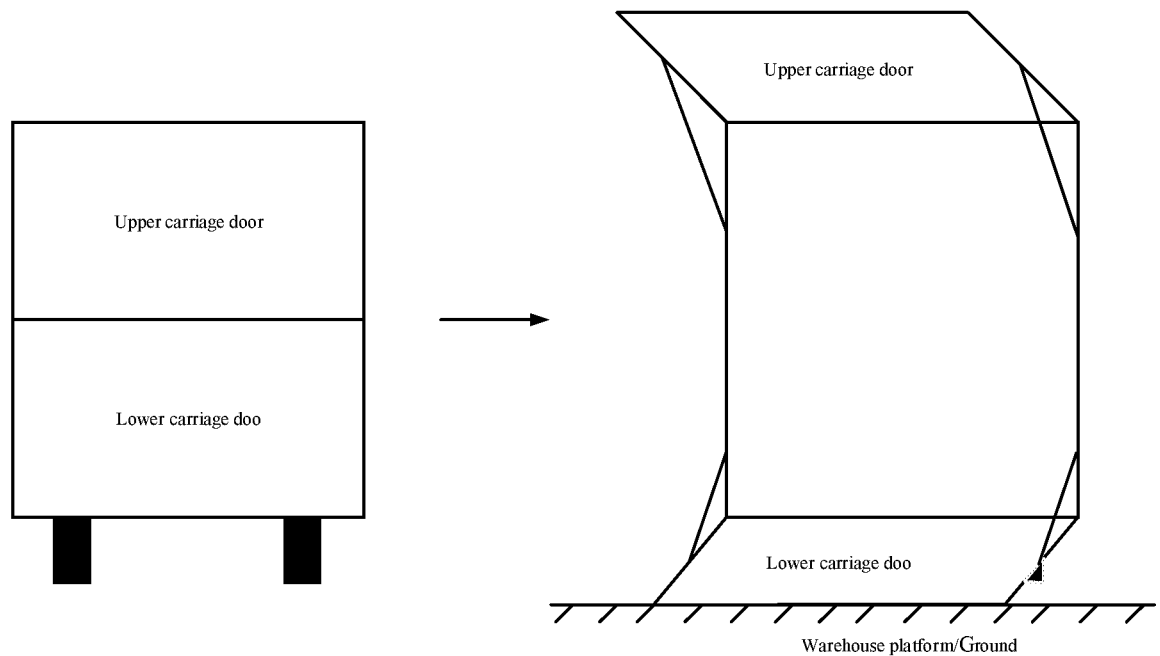
FIG. 3 is the first one of structural schematic diagrams of the carriage door of the carriage in an embodiment of the invention.

First structure: as shown in FIG. 3, the carriage door of the carriage includes an upper carriage door and a lower carriage door which open and close upward and downward, where the lower carriage door is a lifting platform having the automatic lifting function. The vehicle controller controls the carriage door of the carriage to open automatically, which is achieved as follows: the vehicle controller controls the upper carriage door to open upward and controls the lower carriage door to open downward and fall down onto the warehouse platform.

Figure 4:
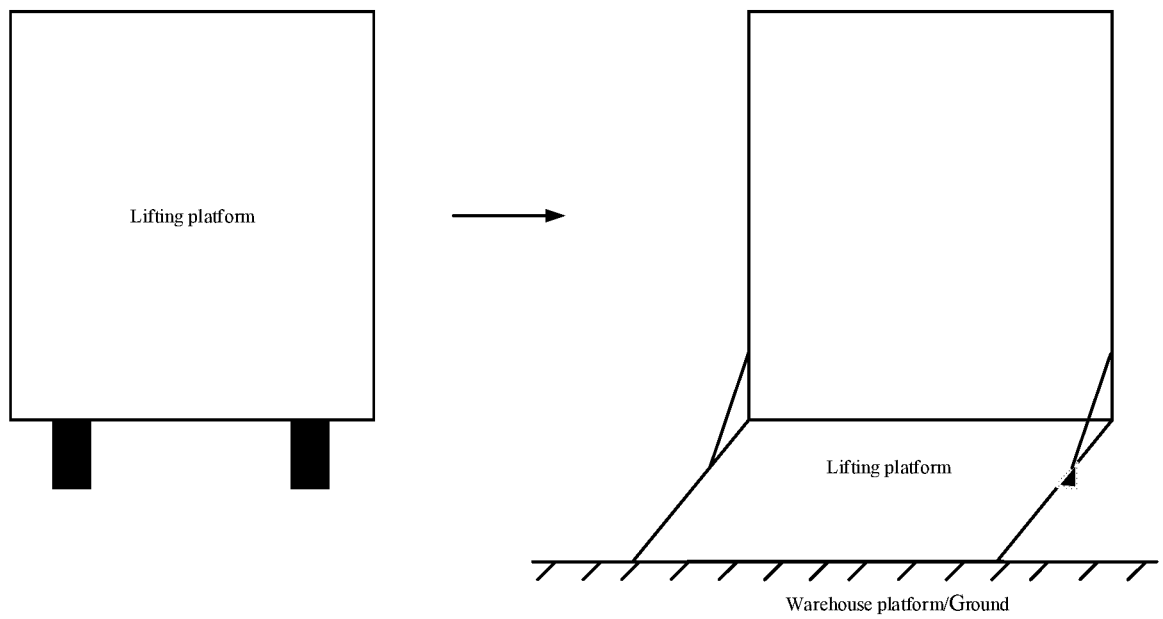
FIG. 4 is the second one of structural schematic diagrams of the carriage door of the carriage in an embodiment of the invention.

Second structure: as shown in FIG. 4, the carriage door of the carriage includes a lifting platform having the automatic lifting function, where the lifting platform is the carriage door of the carriage when it takes back. The vehicle controller controls the carriage door of the carriage to open automatically, which is achieved as follows: the vehicle controller controls the lifting platform to open downward and fall down onto the warehouse platform.

Figure 5:
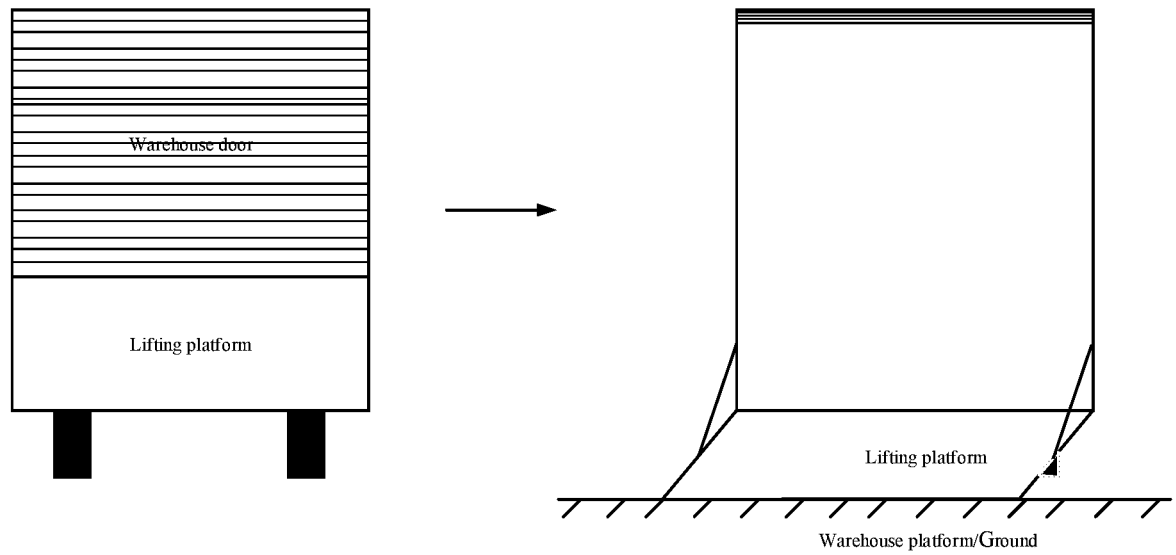
FIG. 5 is the third one of structural schematic diagrams of the carriage door of the carriage in an embodiment of the invention.

Third structure: as shown in FIG. 5, the carriage door of the carriage includes a rolling door and a lifting platform having the lifting function. The vehicle controller controls the rolling door of the carriage to open automatically, which is achieved as follows: the vehicle controller controls the lifting platform to open downward and fall down onto the warehouse platform, and then controls the rolling door to roll upward to the top.

Figure 6:
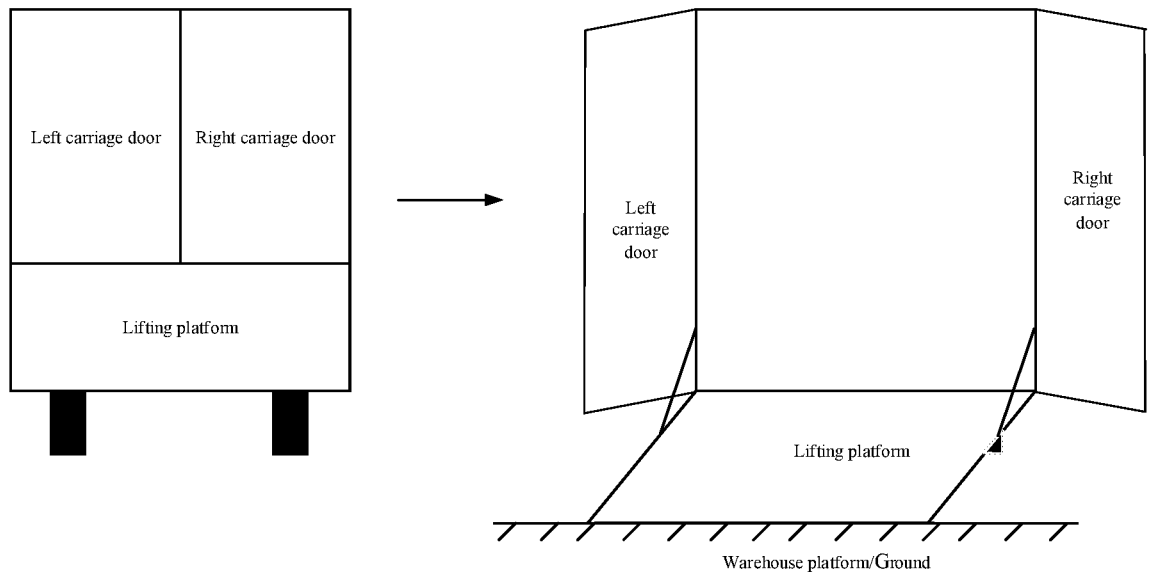
FIG. 6 is the fourth one of structural schematic diagrams of the carriage door of the carriage in an embodiment of the invention.

Fourth structure: as shown in FIG. 6, the carriage door of the carriage includes a left carriage door and a right carriage door which open with respect to each other at the left and right, and a lifting platform having the lifting function. The vehicle controller controls the carriage door of the carriage to open automatically, which is achieved as follows: the vehicle controller controls the lifting platform to open downward and fall down onto the warehouse platform, and then controls the left carriage door and the right carriage door to open outward.

Moreover, the left carriage door and the right carriage door in the fourth structure described above can also be set to an electric retractable door which stretches towards the left and right.

The structure of the carriage door of the carriage can further includes a carriage door and a pallet. The carriage door of the carriage can be composed of an upper carriage door and a lower carriage door which open and close upward and downward, or can be composed of a left carriage door and a right carriage door which open with respect to each other at the left and right. The pallet can be pulled and pushed on the carriage floor or the vehicle undercarriage by the sliding rail, like the drawer structure.

In the second example, a freight list is prestored in the loading and unloading control apparatus, and a correspondence between the vehicle identification information of each vehicle and the freight information is recorded in the freight list, wherein the freight information includes the target warehouse, the position at which the target warehouse is located, the loading and unloading position, the cargo list and the like. When the vehicle loads, the loading and unloading control apparatus obtains the target warehouse, the position of the target warehouse, the loading and unloading position and the cargo list corresponding to the vehicle identification information from the freight list, and sends a loading instruction carrying the target warehouse, the position of the target warehouse, the loading and unloading position and the cargo list to the loading and unloading machine, so that the loading and unloading machine reaches the target warehouse and loads the cargoes corresponding to the cargo list onto the vehicle stopping at the loading and unloading position. When the vehicle unloads, the loading and unloading control apparatus obtains the target warehouse, the position of the target warehouse, the loading and unloading position and the cargo list corresponding to the vehicle identification information from the freight list, and sends an unloading instruction carrying the target warehouse, the position of the target warehouse, the loading and unloading position and the cargo list to the loading and unloading machine, so that the loading and unloading machine unloads the cargoes on the vehicle at the loading and unloading position and places them in the target warehouse.

In some embodiments, there is a dead zone behind the vehicle, so in order to accurately control the vehicle to drive automatically and stop at the loading and unloading position, in an embodiment of the invention, the loading and unloading control apparatus further includes a roadside base station, which is mounted nearly to the loading and unloading control apparatus, e.g., at the road side, on the street lamp, on the warehouse door, on the gantry crane or the like.

In some embodiments, the vehicle controller controls the vehicle to drive automatically and stop at the loading and unloading position in the step 101, which can be achieved by but not limited to any of the following modes (modes B1 to B2):

Mode B1: the vehicle controller receives the environmental information and information of a position at which the roadside base station is located from the roadside base station, and receives information of a position at which the vehicle is located from an on-board sensor (such as a positioning sensor, e.g., GPS, Inertial Measurement Unit (IMU) or the like) of the vehicle; and the vehicle controller controls the vehicle to drive and stop at the loading and unloading position in accordance with a preset position and pose according to the position at which the vehicle is located, the position at which the roadside base station is located and the environmental information.

Mode B2: the vehicle controller controls an on-board sensor to send a position at which the vehicle is located to the roadside base station, and controls the vehicle to drive and stop at the loading and unloading position in accordance with a preset position and pose according to driving guidance information (e.g., turning left by x degrees, turning right by x degrees, moving back by x meters, or the like) sent by the roadside base station, wherein the driving guidance information is a driving control instruction generated by the roadside base station according to the position at which the vehicle is located and a position at which the roadside base station is located.

In the mode B2, the roadside base station obtains the vehicle kinematics model by the vehicle controller, calculates the optimum path of the vehicle from the current position to the designated position according to the vehicle kinematics model, the current position of the vehicle and the current pose of the vehicle; and the roadside base station calculates the steering angle and speed of the vehicle according to the optimum path, the current pose of the vehicle, the current position of the vehicle and the vehicle kinematics model, and sends the steering angle and speed to the vehicle controller, so that the vehicle controller controls the vehicle to drive and stop at the loading and unloading position according to the steering angle and speed.

In the modes B1 and B2, the preset position and pose is related to the position of the carriage door of the vehicle. When the carriage door of the carriage is arranged at the rear side of the vehicle, the preset position and pose is that the rear of the vehicle faces directly to the warehouse door; when the carriage door of the carriage is arranged on the side of the vehicle, the preset position and pose is that the side of the vehicle faces directly to the warehouse door.

SECOND EMBODIMENT

Figure 7:
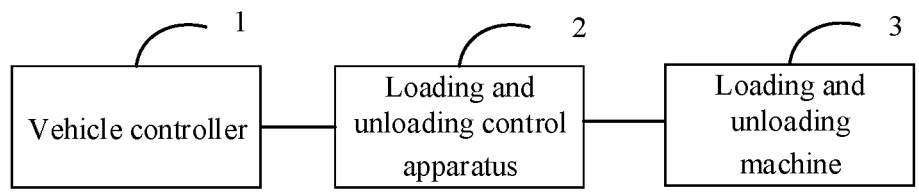
FIG. 7 is a structural schematic diagram of a system of implementing vehicle automatic loading and unloading in an embodiment of the invention.

Based upon the same concept as the method of implementing vehicle automatic loading and unloading provided by the first embodiment described above, the second embodiment of the invention further provides a system of implementing vehicle automatic loading and unloading. The structure of the system is as shown in FIG. 7, which includes a vehicle controller 1, a loading and unloading control apparatus 2 and a loading and unloading machine 3, wherein:

the vehicle controller 1 is configured to control a vehicle to drive automatically and stop at a loading and unloading position; and control the vehicle to leave the loading and unloading position when receiving a loading and unloading completion indication sent by the loading and unloading control apparatus corresponding to the loading and unloading position;

the loading and unloading control apparatus 2 is configured to obtain vehicle identification information of the vehicle, and verify the vehicle identification information; control the loading and unloading machine 3 to load and unload when the verification succeeds, and send the loading and unloading completion indication to the vehicle controller of the vehicle after the loading and unloading is completed.

In the second embodiment of the invention, the mode in which the loading and unloading control apparatus 2 obtains the vehicle identification information of the vehicle and the mode in which the loading and unloading control apparatus 2 verifies the vehicle identification information can refer to the related technical content in the first embodiment, and a detailed description thereof will be omitted here.

In an example, the vehicle is a container vehicle; and the loading and unloading control apparatus 2 controls the loading and unloading machine to load and unload when the verification succeeds, which includes:

the loading and unloading control apparatus 2 controls the loading and unloading machine 3 to load a container corresponding to the vehicle identification information to the vehicle; or, controls the loading and unloading machine 3 to unload a container from the vehicle.

In another example, the vehicle is a van, a carriage door of a carriage of the vehicle can be electronically controlled to open and close, a lifting platform is arranged at a lower end of the carriage door, the loading and unloading position is in front of a warehouse door of a target warehouse, the warehouse door has a warehouse platform;

the vehicle controller 1 is further configured to: control the carriage door of the carriage to open automatically, and control the lifting platform to fall down to the warehouse platform, after controlling the vehicle to stop at the loading and unloading position; and control the carriage door of the carriage to close automatically and control the lifting platform to take back when receiving the loading and unloading completion indication; and the loading and unloading control apparatus 2 is further configured to: control the warehouse door to open automatically when the verification succeeds, and control the warehouse door to close when the loading and unloading machine 3 completes the loading and unloading.

In the second embodiment of the invention, the magnetic nails or magnetic stripes are laid on the warehouse platform, the lifting platform and the carriage floor; and the loading and unloading control apparatus 2 controls the loading and unloading machine 3 to load and unload, which includes:

the loading and unloading control apparatus 2 controls the loading and unloading machine 3 to uninterruptedly sense by its magnetic navigation sensor magnetic signals generated by the magnetic nails/magnetic stripes laid on the warehouse platform, the lifting platform and the carriage floor, and perform navigation tracking according to a preset and fixed path, to implement the loading and unloading.

In the second embodiment of the invention, the structure of the carriage can refer to the structures listed in the first embodiment, and a detailed description thereof will be omitted here.

In an example, the loading and unloading control apparatus 2 includes a roadside base station, and the vehicle controller 1 controls the vehicle to drive automatically and stop at the loading and unloading position, which includes: the vehicle controller 1 receives the environmental information and information of a position at which the roadside base station is located from the roadside base station, and receives information of a position at which the vehicle is located from an on-board sensor of the vehicle; and the vehicle controller 1 controls the vehicle to drive and stop at the loading and unloading position in accordance with a preset position and pose according to the position at which the vehicle is located, the position at which the roadside base station is located and the environmental information.

In another example, the loading and unloading control apparatus contains a roadside base station, and the vehicle controller 1 controls the vehicle to drive automatically and stop at the loading and unloading position, which includes: the vehicle controller 1 controls an on-board sensor to send a position at which the vehicle is located to the roadside base station, and controls the vehicle to drive and stop at the loading and unloading position in accordance with a preset position and pose according to driving guidance information sent by the roadside base station, wherein the driving guidance information is a driving control instruction generated by the roadside base station according to the position at which the vehicle is located and a position at which the roadside base station is located.

THIRD EMBODIMENT

Figure 8:
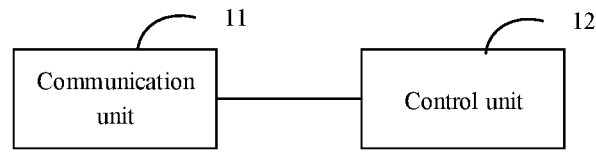
FIG. 8 is a structural schematic diagram of a vehicle controller in an embodiment of the invention.

The third embodiment of the invention provides a vehicle controller. The structure of the vehicle controller is as shown in FIG. 8, which includes:

a communication unit 11 configured to receive and send information; and a control unit 12 configured to control a vehicle to drive automatically and stop at a loading and unloading position; and control the vehicle to leave the loading and unloading position when receiving a loading and unloading completion indication sent by a loading and unloading control apparatus corresponding to the loading and unloading position.

In an example, the vehicle is a van, a carriage door of a carriage of the vehicle can be electronically controlled to open and close, a lifting platform is arranged at a lower end of the carriage door, the loading and unloading position is in front of a warehouse door of a target warehouse, the warehouse door has a warehouse platform; and the control unit 12 is further configured to: control the carriage door of the carriage to open automatically, and control the lifting platform to fall down to the warehouse platform after controlling the vehicle to stop at the loading and unloading position; and control the carriage door of the carriage to close automatically and control the lifting platform to take back when receiving, by the communication unit 11, the loading and unloading completion indication.

In an example, the control unit 12 is further configured to: receive, by the communication unit 11, the environmental information and information of a position at which a roadside base station of the loading and unloading control apparatus is located from the roadside base station, and receive information of a position at which the vehicle is located from an on-board sensor; and the control unit 12 controls the vehicle to drive automatically and stop at the loading and unloading position, which is configured to: control the vehicle to drive and stop at the loading and unloading position in accordance with a preset position and pose according to the position at which the vehicle is located, the position at which the roadside base station is located and the environmental information.

In another example, the control unit 12 is further configured to: control an on-board sensor to send a position at which the vehicle is located to the roadside base station; and control the vehicle to drive and stop at the loading and unloading position in accordance with a preset position and pose according to driving guidance information received by the communication unit 11 from the roadside base station, wherein the driving guidance information is a driving control instruction generated by the roadside base station according to the position at which the vehicle is located and a position at which the roadside base station is located.

FOURTH EMBODIMENT

Figure 9:
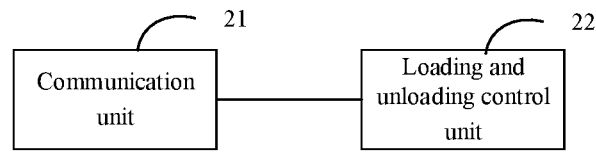
FIG. 9 is the first one of structural schematic diagrams of a loading and unloading control apparatus in an embodiment of the invention.

The fourth embodiment of the invention provides a loading and unloading control apparatus. The structure of the loading and unloading control apparatus is as shown in FIG. 9, which includes:

a communication unit 21 configured to receive and send information;

a loading and unloading control unit 22 configured to obtain vehicle identification information of a vehicle stopping at a loading and unloading position, and verify the vehicle identification information; control a loading and unloading machine to load and unload when the verification succeeds, and send, by the communication unit 21, a loading and unloading completion indication to a vehicle controller of the vehicle after the loading and unloading is completed.

In an example, the vehicle is a container vehicle, and the loading and unloading control unit 22 controls the loading and unloading machine to load and unload, which includes: controls the loading and unloading machine to load a container corresponding to the vehicle identification information to the vehicle; or, controls the loading and unloading machine to unload a container from the vehicle.

In another example, the vehicle is a van, and the loading and unloading control unit 22 is further configured to: control a warehouse door of a target warehouse to open automatically when the verification succeeds, and control the warehouse door to close automatically when the loading and unloading machine completes the loading and unloading.

In some embodiments, a lifting platform is arranged at a lower end of a carriage door of a carriage of the vehicle, the warehouse door comprises a warehouse platform, and magnetic nails or magnetic stripes are laid on the warehouse platform, the lifting platform and a carriage floor; and the loading and unloading control unit 22 controls the loading and unloading machine to load and unload, which includes: controls the loading and unloading machine to uninterruptedly sense by its magnetic navigation sensor magnetic signals generated by the magnetic nails/magnetic stripes laid on the warehouse platform, the lifting platform and the carriage floor, and performs navigation tracking according to a preset and fixed path, to implement the loading and unloading.

Figure 10:
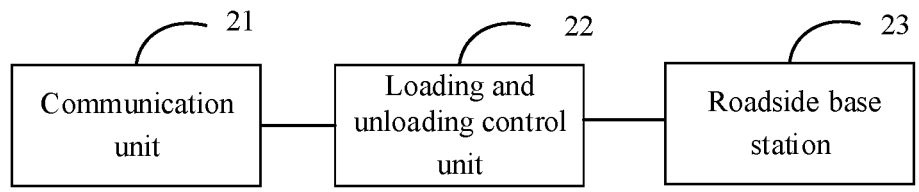
FIG. 10 is the second one of structural schematic diagrams of a loading and unloading control apparatus in an embodiment of the invention.

In some embodiments, the loading and unloading control apparatus further includes a roadside base station 23, as shown in FIG. 10.

The roadside base station 23 is configured to gather the environmental information according to an instruction sent by the loading and unloading control unit 22, and send the environmental information and information of a position at which the roadside base station is located to the vehicle controller; or, the roadside base station 23 is configured to receive, by the communication unit 21, a position at which the vehicle is located from the vehicle controller, generate driving guidance information according to environmental information, a position at which the roadside base station is located and the position at which the vehicle is located, and send the driving guidance information to the vehicle controller.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A method of implementing vehicle automatic loading and unloading, comprising:
controlling, by a vehicle controller, a vehicle to drive automatically and stop at a loading and unloading position;
receiving, by a loading and unloading control apparatus corresponding to the loading and unloading position, a vehicle arriving indication comprising:
a number of the loading and unloading position; and
an indication that the vehicle has stopped at the loading and unloading position;
obtaining, by the loading and unloading control apparatus corresponding to the loading and unloading position, in response to receiving the vehicle arriving indication, vehicle identification information of the vehicle by using at least one of a plurality of modes;

verifying, by the loading and unloading control apparatus corresponding to the loading and unloading position, the vehicle identification information; and controlling, by the loading and unloading control apparatus corresponding to the loading and unloading position, a loading and unloading machine to load and unload, in response to the verification succeeding, wherein a vehicle identification information list is pre-stored in the loading and unloading control apparatus, and wherein when the vehicle identification information matches the vehicle identification information list, the verification succeeds, and when the vehicle identification information does not match the vehicle identification information list, the loading and unloading control apparatus sends the vehicle identification information to a remote server for verification;

sending a loading and unloading completion indication to the vehicle controller after the loading and unloading is completed; and controlling, by the vehicle controller, the vehicle to leave the loading and unloading position when receiving the loading and unloading completion indication, wherein the vehicle comprises a carriage door including a lifting platform, the loading and unloading position is in front of a warehouse door of a target warehouse, and the warehouse door has a warehouse platform, wherein the loading and unloading machine comprises a magnetic navigation sensor configured to sense magnetic signals in response to the lifting platform falling down to the warehouse platform, wherein the magnetic signals are generated by magnetic nails provided on the lifting platform of the carriage door of the vehicle, wherein the plurality of modes includes:

a first mode in which the loading and unloading control apparatus receives the vehicle identification information from the vehicle controller;

a second mode in which the loading and unloading control apparatus compares features extracted from an image of the vehicle with features corresponding to present vehicle identification information; and a third mode in which the loading and unloading control apparatus scans a two-dimensional code on the vehicle.

2. The method according to claim 1, wherein the loading and unloading control apparatus contains a roadside base station, and controlling, by the vehicle controller, the vehicle to drive automatically and stop at the loading and unloading position, comprises:

receiving, by the vehicle controller, environmental information and information of a position at which the roadside base station is located from the roadside base station, and receiving information of a position at which the vehicle is located from an on-board sensor of the vehicle; and controlling, by the vehicle controller, the vehicle to drive and stop at the loading and unloading position in accordance with a preset position and pose according to the position at which the vehicle is located, the position at which the roadside base station is located and the environmental information.

3. The method according to claim 1, wherein the loading and unloading control apparatus contains a roadside base station, and controlling, by the vehicle controller, the vehicle to drive automatically and stop at the loading and unloading position, comprises:

controlling, by the vehicle controller, an on-board sensor to send a position at which the vehicle is located to the roadside base station, and controlling the vehicle to drive and stop at the loading and unloading position in accordance with a preset position and pose according to driving guidance information sent by the roadside base station, wherein the driving guidance information is a driving control instruction generated by the roadside base station according to the position at which the vehicle is located and a position at which the roadside base station is located.

4. The method according to claim 1, wherein obtaining, by the loading and unloading control apparatus, the vehicle identification information of the vehicle, comprises:

receiving the vehicle identification information of the vehicle from the vehicle controller; or identifying the vehicle identification information of the vehicle.

5. The method according to claim 1, wherein the vehicle is a container vehicle; and controlling the loading and unloading machine to load and unload when the verification succeeds, comprises:

controlling, by the loading and unloading control apparatus, the loading and unloading machine to load a container corresponding to the vehicle identification information to the vehicle; or controlling the loading and unloading machine to unload a container from the vehicle.

6. The method according to claim 5, wherein the loading and unloading machine is a gantry crane, forklift or crane.

7. The method according to claim 1, wherein: the vehicle is a van; the carriage door of the vehicle can be electronically controlled to open and close; the lifting platform is arranged at a lower end of the carriage door; and the method further comprises:

controlling, by the vehicle controller, the carriage door to open automatically, and controlling the lifting platform to fall down to the warehouse platform after controlling the vehicle to stop at the loading and unloading position;

controlling, by the vehicle controller, the carriage door to close automatically and controlling the lifting platform to take back when receiving the loading and unloading completion indication; and controlling, by the loading and unloading control apparatus, the warehouse door to open automatically when the verification succeeds, and controlling the warehouse door to close when the loading and unloading machine completes the loading and unloading.

8. The method according to claim 7, wherein the magnetic nails are further laid on the warehouse platform, and a carriage floor; and wherein controlling, by the loading and unloading control apparatus, the loading and unloading machine to load and unload, comprises:

controlling, by the loading and unloading control apparatus, the loading and unloading machine to uninterruptedly sense, by the magnetic navigation sensor, the magnetic signals generated by the magnetic nails, and perform navigation tracking according to a preset and fixed path, to implement the loading and unloading.

9. The method according to claim 7, wherein the loading and unloading machine is a robot or forklift.

10. A vehicle controller, comprising:

a communication unit configured to receive and send information from or to a loading and unloading control apparatus configured to obtain vehicle identification information of a vehicle stopping at a loading and unloading position corresponding to the loading and unloading control apparatus in response to receiving a vehicle arriving indication, the vehicle arriving indication carrying a number of the loading and unloading position and indicating that the vehicle stops at the loading and unloading position, wherein a vehicle identification information list is prestored in the loading and unloading control apparatus, and wherein when a vehicle identification information matches the vehicle identification information list, a verification succeeds, and when the vehicle identification information does not match the vehicle identification information list, the loading and unloading control apparatus sends the vehicle identification information to a remote server for verification; and a control unit configured to:

control the vehicle to drive automatically and stop at the loading and unloading position; and control the vehicle to leave the loading and unloading position when receiving a loading and unloading completion indication sent by the loading and unloading control apparatus corresponding to the loading and unloading position, wherein the communication unit sends a loading and unloading request to the loading and unloading apparatus so that the loading and unloading apparatus obtains the vehicle identification information according to the loading and unloading request, or wherein the communication unit sends the vehicle identification information actively when the loading and unloading apparatus is in a mode in which the loading and unloading apparatus obtains the vehicle identification information from the vehicle controller, wherein the vehicle comprises a carriage door including a lifting platform, the loading and unloading position is in front of a warehouse door of a target warehouse, and the warehouse door has a warehouse platform, wherein the control unit is further configured to control the lifting platform to fall down to the warehouse platform in response to the vehicle stopping at the loading and unloading position, so that magnetic signals generated by magnetic nails provided on the lifting platform of the carriage door of the vehicle are sensed by a magnetic navigation sensor of the loading and unloading machine.

11. The vehicle controller according to claim 10, wherein: the vehicle is a van; the carriage door of the vehicle can be electronically controlled to open and close; the lifting platform is arranged at a lower end of the carriage door; and wherein the control unit is further configured to:

control the carriage door to open automatically;

control the carriage door to close automatically; and control the lifting platform to take back when receiving, by the communication unit, the loading and unloading completion indication.

12. The vehicle controller according to claim 10, wherein the control unit is further configured to: receive, by the communication unit, environmental information and information of a position at which a roadside base station of the loading and unloading control apparatus is located from the roadside base station; and receive information of a position at which the vehicle is located from an on-board sensor; and wherein the control unit controls the vehicle to drive automatically and stop at the loading and unloading position, which is configured to control the vehicle to drive and stop at the loading and unloading position in accordance with a preset position and pose according to the position at which the vehicle is located, the position at which the roadside base station is located, and the environmental information.

13. The vehicle controller according to claim 10, wherein the control unit is further configured to: control an on-board sensor to send a position at which the vehicle is located to a roadside base station; and control the vehicle to drive and stop at the loading and unloading position in accordance with a preset position and pose according to driving guidance information received by the communication unit from the roadside base station, wherein the driving guidance information is a driving control instruction generated by the roadside base station according to the position at which the vehicle is located and a position at which the roadside base station is located.

14. A loading and unloading control apparatus, comprising:

a communication unit configured to receive and send information; and a loading and unloading control unit configured to:

receive a vehicle arriving indication comprising a number of the loading and unloading position;

obtain vehicle identification information of a vehicle stopping at a loading and unloading position in response to receiving the vehicle arriving indication;

verify the vehicle identification information; control a loading and unloading machine to load and unload when the verification succeeds; and send, by the communication unit, a loading and unloading completion indication to a vehicle controller of the vehicle after the loading and unloading is completed, wherein a vehicle identification information list is prestored in the loading and unloading control apparatus, and wherein when the vehicle identification information matches the vehicle identification information list, the verification succeeds, and when the vehicle identification information does not match the vehicle identification information list, the loading and unloading control apparatus sends the vehicle identification information to a remote server for verification, wherein the vehicle comprises a carriage door including a lifting platform, the loading and unloading position is in front of a warehouse door of a target warehouse, and the warehouse door has a warehouse platform, wherein the loading and unloading control unit controls the loading and unloading machine to load and unload, which comprises:

controlling a magnetic navigation sensor of the loading and unloading machine to sense magnetic signals in response to the lifting platform falling down to the warehouse platform, wherein the magnetic signals are generated by magnetic nails provided on the lifting platform of the carriage door of the vehicle, wherein the loading and unloading control apparatus is configured to obtain the vehicle identification information:

by receiving, in the first mode, the vehicle identification information transmitted by the vehicle controller;

by comparing, in the second mode, features extracted from an image of the vehicle with features corresponding to present vehicle identification information; or by scanning, in the third mode, a code on the vehicle.

15. The loading and unloading control apparatus according to claim 14, wherein the code on the vehicle includes a two-dimensional code containing the vehicle identification information located on a particular position of the vehicle.

16. The loading and unloading control apparatus according to claim 14, wherein the vehicle is a van, and the loading and unloading control unit is further configured to:
   control the warehouse door of the target warehouse to open automatically when the verification succeeds; and
   control the warehouse door to close automatically when the loading and unloading machine completes the loading and unloading.

17. The loading and unloading control apparatus according to claim 16, wherein: the lifting platform is arranged at a lower end of the carriage door of the vehicle; and the magnetic nails are further laid on the warehouse platform, and a carriage floor; and
   wherein the loading and unloading control unit controls the loading and unloading machine to load and unload, which comprises:
   performing navigation tracking according to a preset and fixed path, to implement the loading and unloading.

18. The loading and unloading control apparatus according to claim 14, wherein the loading and unloading control apparatus is configured to control a sensor to take the image of the vehicle.

19. The loading and unloading control apparatus according to claim 18, wherein the loading and unloading control apparatus is further configured to perform image identification processing on the image to obtain the vehicle identification information of the vehicle.

20. The loading and unloading control apparatus according to claim 18, wherein the sensor includes a video camera a shooting angle of which is adjusted automatically.

\* \* \* \* \*